US009485016B2

(12) United States Patent
Kassler

(10) Patent No.: US 9,485,016 B2
(45) Date of Patent: Nov. 1, 2016

(54) HANDS-FREE OPTICAL FIBER TESTING USING OPTICAL LOSS TEST INSTRUMENT

(71) Applicant: Harlan Kassler, Austin, TX (US)

(72) Inventor: Harlan Kassler, Austin, TX (US)

(73) Assignee: Fluke Corporation, Everett, WA (US)

( * ) Notice: Subject to any disclaimer, the term of this patent is extended or adjusted under 35 U.S.C. 154(b) by 231 days.

(21) Appl. No.: 14/033,040

(22) Filed: Sep. 20, 2013

(65) Prior Publication Data

US 2015/0086194 A1 Mar. 26, 2015

(51) Int. Cl.
*H04B 10/00* (2013.01)
*H04B 10/077* (2013.01)
*H04B 10/073* (2013.01)
*H04B 10/079* (2013.01)

(52) U.S. Cl.
CPC ...... *H04B 10/0779* (2013.01); *H04B 10/0731* (2013.01); *H04B 10/0773* (2013.01); *H04B 10/0775* (2013.01); *H04B 10/07955* (2013.01)

(58) Field of Classification Search
CPC ................................. G01M 11/3136
USPC ....................................... 398/25
See application file for complete search history.

(56) References Cited

U.S. PATENT DOCUMENTS

| | | | | | |
|---|---|---|---|---|---|
| 5,196,899 | A | * | 3/1993 | Serwatka | G01M 11/30 356/73.1 |
| 6,004,042 | A | * | 12/1999 | Million | G02B 6/3807 385/59 |
| 6,122,043 | A | * | 9/2000 | Barley | G01M 11/3127 356/73.1 |
| 8,213,002 | B2 | * | 7/2012 | Kassler | G01M 11/3145 356/73.1 |
| 8,565,618 | B2 | * | 10/2013 | Xia | H04B 10/071 356/450 |
| 2002/0101577 | A1 | * | 8/2002 | Thwing | G01M 11/31 356/73.1 |
| 2005/0110979 | A1 | * | 5/2005 | Harres | G01M 11/3109 356/73.1 |
| 2006/0198634 | A1 | * | 9/2006 | Ofalt | H04B 10/077 398/16 |
| 2007/0025676 | A1 | * | 2/2007 | Russell | G01M 11/3136 385/134 |
| 2007/0253662 | A1 | * | 11/2007 | Patel | G01M 11/39 385/13 |
| 2009/0040509 | A1 | * | 2/2009 | Goldstein | G01M 11/3145 356/73.1 |
| 2011/0267602 | A1 | * | 11/2011 | Bills | G01M 11/3154 356/73.1 |
| 2012/0163804 | A1 | * | 6/2012 | Xia | H04B 10/0775 398/25 |
| 2013/0194566 | A1 | | 8/2013 | Schell et al. | |

FOREIGN PATENT DOCUMENTS

| | | |
|---|---|---|
| EP | 1816459 A1 | 8/2007 |
| EP | 2623948 A1 | 8/2013 |
| EP | 2627041 A2 | 8/2013 |

OTHER PUBLICATIONS

Extended European Search Report for European Patent Application No. 14185520.5, dated Apr. 8, 2015.

* cited by examiner

*Primary Examiner* — Danny Leung
(74) *Attorney, Agent, or Firm* — Locke Lord LLP; Scott D. Wofsy; Christopher J. Capelli

(57) ABSTRACT

A method for testing the operation of an optical fiber cable in a communication network using an optical loss test set (OLTS) instrument includes receiving a range of identifiers of fibers to be tested. Identifiers of a first fiber set to be tested are displayed. The first fiber set comprises one or more fibers. The first fiber pair is included in the range. The first fiber pair is a next fiber pair to be tested. A determination is made whether the first fiber set is connected to the OLTS instrument. In response to determining that the first fiber set is connected to the OLTS instrument, a test of the first fiber set operation is performed using the OLTS instrument. Identifiers of a second fiber set are displayed. The second fiber set is included in the range and constitutes a next fiber set to be tested.

20 Claims, 6 Drawing Sheets

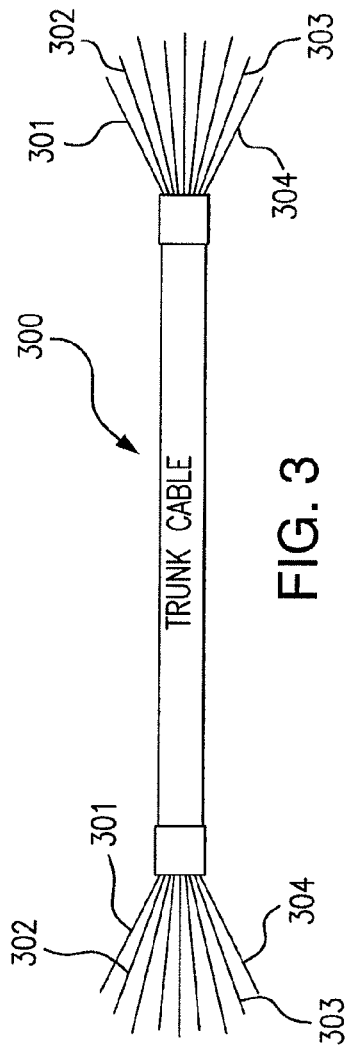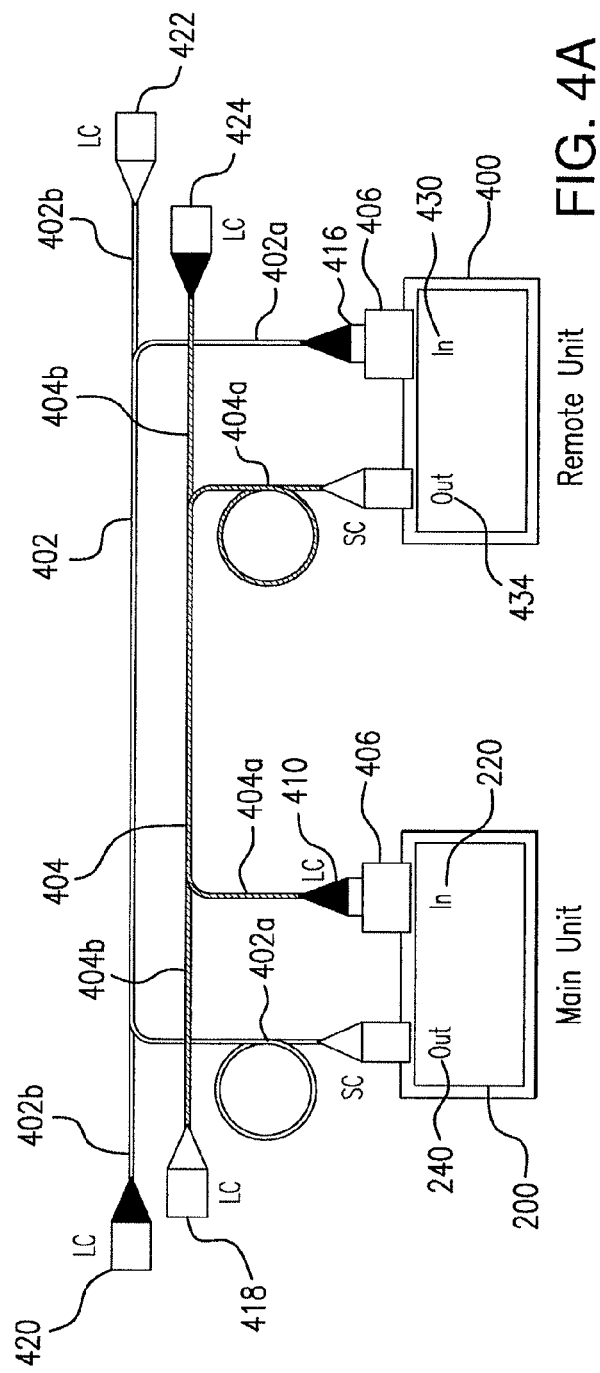

View Reference

258 —

Remote End Setup:
Smart Remote

|  | 850nm | 1300nm |
|---|---|---|
| Input (dBm) | −19.16 | −19.51 |
| Output (dBm) | −18.54 | −18.92 |

Test Method: Method B
Reference set:

05/05/2009    4:48:03p.m.

OK

| Loss (M->R) | PASS |
|---|---|

Input Fiber

1300nm  Loss:    0.92dB
        Limit:   2.30dB
0.0  4.0 Margin: 1.38dB

850nm   Loss:    0.88dB
        Limit:   3.36dB
0.0  4.0 Margin: 2.48dB

Press SAVE when done

| Other Dir. | | View Ref. |

— 258

454

HANDS-FREE OPTICAL FIBER TESTING USING OPTICAL LOSS TEST INSTRUMENT

FIELD OF THE INVENTION

Embodiments of the present invention relate to estimating optical insertion loss, and particularly to optical fiber testing using optical loss test instruments.

BACKGROUND OF THE INVENTION

Optical fibers in general are known in the art, and typically comprise a transparent core of a suitable glass or plastic material which is contained within a cylindrical cladding having an index of refraction less than the refractive index of the core. A plastic jacket or coating protects the fiber on the outside. When a light signal is focused upon one end of the fiber, the fiber core functions as a waveguide to transmit or propagate the light signal through the core with relatively small internal intensity losses and negligible transmission of the signal to the cladding. An important feature of this type of optical fiber is that gradual turns or bends in the fiber have little or no effect upon transmission of the light signal. Fiber optic cables may consist of a single fiber or many optical fibers. Each fiber is an independent optical waveguide in its operation by containing and transmitting signals completely, radiating virtually no external optical energy.

It may be necessary in installing and/or servicing fiber optic networks to be able to measure insertion loss within an optical network. Insertion loss within an optical network should be determined to be within acceptable limits in order to verify proper physical contact between adjoining optical fibers and to maintain the system loss budget. Currently, one specified way of determining insertion loss is with the use of a hand-held optical loss test set, which measures the insertion loss through a length of optical fiber that may include one or more joining points between adjoining optical fibers.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for testing the operation of an optical fiber cable in a communication network using an optical loss test set (OLTS) instrument, having a first unit and a second unit, includes receiving a range of identifiers of fiber sets to be tested. Identifiers of a first fiber set to be tested are displayed. The first fiber set comprises one or more fibers. The first fiber set is a next fiber set to be tested. A determination is made whether the first fiber set is connected to the OLTS instrument. In response to determining that the first fiber set is connected to the OLTS instrument, a test of the first fiber set operation is performed using the OLTS instrument. Identifiers of a second fiber set are displayed. The second fiber set is included in the range and comprises a next fiber set to be tested.

In another aspect, a method for testing the operation of an optical fiber connected to an external light source in a communication network, using an optical loss test set (OLTS) instrument, includes determining whether the optical fiber is connected to the OLTS instrument. A connection status indicator is displayed, in response to determining that the optical fiber is connected to the OLTS instrument. The optical fiber is tested using the OLTS instrument. A determination is made whether the optical fiber is disconnected from the OLTS instrument.

BRIEF DESCRIPTION OF THE DRAWINGS

The accompanying appendices and/or drawings illustrate various, non-limiting, examples, inventive aspects in accordance with the present disclosure:

FIG. 3 illustrates a side view of an exemplary fiber optic trunk cable in accordance with an embodiment of the present invention;

FIG. 4A is a diagram illustrating a connection arrangement for establishing a reference power level for loss calculations in accordance with an embodiment of the present invention;

DETAILED DESCRIPTION OF CERTAIN EMBODIMENTS

Figure 1:
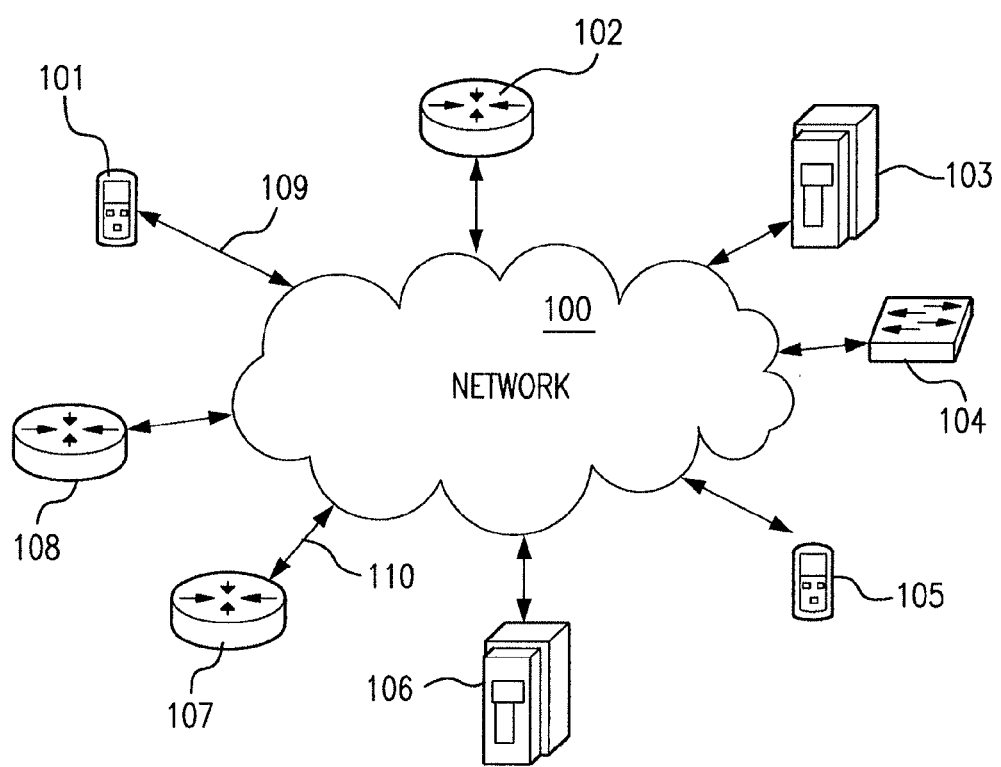
FIG. 1 illustrates an example communication network in accordance with an illustrated embodiment.

The present invention is now described more fully with reference to the accompanying drawings, in which illustrated embodiments of the present invention is shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims.

The method according to a preferred embodiment of the present invention preferably utilizes a palm-sized OLTS instrument for testing optical fibers in optical networks. The instrument can measure, for example, insertion loss of a fiber and may detect live traffic. The OLTS instrument can be used to test for connectivity and network problems. The OLTS tester instrument described herein preferably measures optical loss of two fibers at two wavelengths after measuring the reference power level. The OLTS tester instrument may include two units (hereafter referred to as "main unit" and "remote unit"). Advantageously, the OLTS instrument described herein enables a user to easily and efficiently control the test of transmission links in a fiber optic cable, each link comprising a fiber pair, by reconnecting the OLTS instrument to a plurality of fiber pairs without any direct interaction with the OLTS instrument between each test.

A communication network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an exemplary communication network 100 illustratively comprising nodes/devices 101-108 (e.g., mobile devices, servers, routers, wireless stations, and the like) interconnected by various methods of communication. For instance, the link 109 may comprise a wireless communication medium, where certain nodes are in communication with other nodes, e.g., based on distance, signal strength, current operational status, location, etc. Moreover, each of the devices can communicate data packets (or frames) with other devices using predefined network communication protocols as will be appreciated by those skilled in the art, such as various wired protocols and wireless protocols etc., where appropriate. In this context, a protocol consists of a set of rules defining how the nodes interact with each other.

According to an embodiment of the present invention, the exemplary communication network 100 may include one or more fiber optic links 110. The fiber optic link 110 may be connected to an optical transceiver 107 on both ends for translating the transmitted optical signals into electrical signals. The optical transceivers 107 may be, for example, but not limited to, Small Form Factor Pluggable (SFP) modules.

Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

Figure 2A:
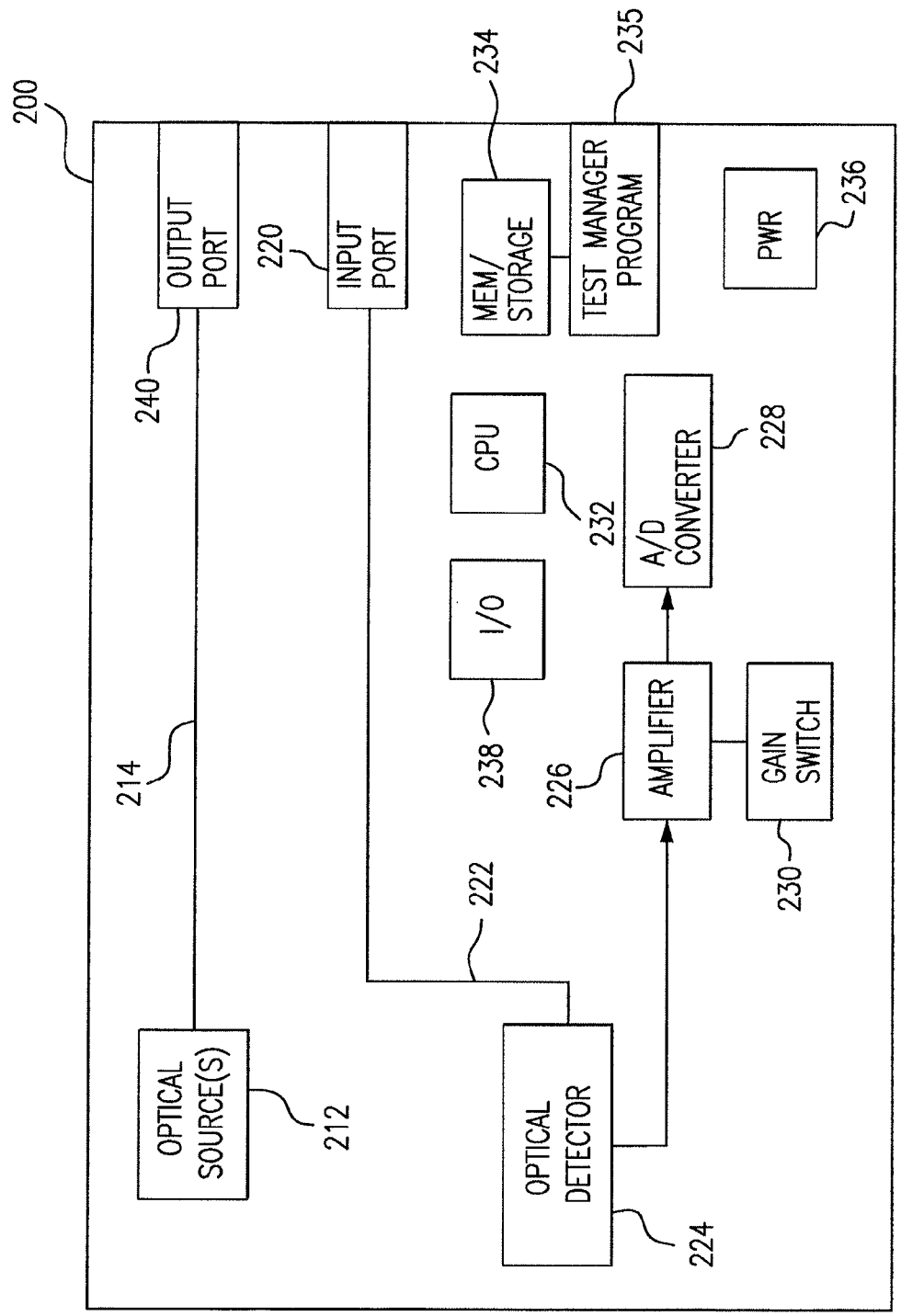
FIG. 2A is an optical topology block diagram of a main unit of an OLTS instrument in accordance with an embodiment of the present invention.

Referring to FIG. 2A, an optical topology block diagram of the main unit 200 of an OLTS instrument is shown in accordance with an embodiment of the present invention. The OLTS instrument is designed for examining and testing optical fibers in telecommunication systems, such as short range telecommunication systems. According to an embodiment of the present invention, the optical topology shown in FIG. 2A may comprise one or more optical sources 212. The optical sources 212 that can be utilized in various embodiments of the present invention include, but are not limited to, LEDs or lasers capable of continuous wave (CW) and/or modulated transmission. The light emitted by the plurality of optical sources 212 may be combined using a combiner, coupler, and the like. The one or more optical sources 212 may be connected to the output port 240 of the main unit 200 by an optical fiber 214. The input port 220 of the main unit 200 is used for the power meter portion of the instrument and may contain, in the preferred embodiment, an optical PIN detector. In an alternative embodiment, shown in FIG. 2A, the optical PIN detector 224 may be connected to the input port 220 via optical fiber 222. The optical detector 224 converts the reflected light to electrical energy which is supplied to and then amplified by the operational amplifier 226, whose gain can be varied by a gain switch 230 to detect a wide range of optical power levels. An analog to digital converter 228 may transform the analog signal to a digital signal that may then be signal averaged to improve the signal to noise ratio.

One or more microprocessor(s) (CPU 232) may comprise hardware elements or hardware logic adapted to execute the software programs and manipulate the data structures. The one or more microprocessor(s) 232 may execute, for example, a test manager program 235, which may be stored in the memory/storage 234, to control operation of the main unit 200. The test manager program 235 may comprise program instructions stored on one or more computer-readable storage devices, which may include internal storage 234 of the main unit 200. The test manager program 235 may be, for example, a computer program or program component for controlling tests performed by the main unit 200 of the OLTS instrument. Data gathered, generated, and maintained for use by the test manager program 235 may be kept in the internal storage 234 of the main unit 200. A power block 236 may provide the power source to operate the main unit 200, suitably battery power for portably hand-held use. I/O 238 may provide one or more interfaces with the user of the main unit 200, and may include a display and input devices, such as cursor control keys and other keys for allowing user operation and display/output of results (shown in FIG. 2B).

Figure 2B:
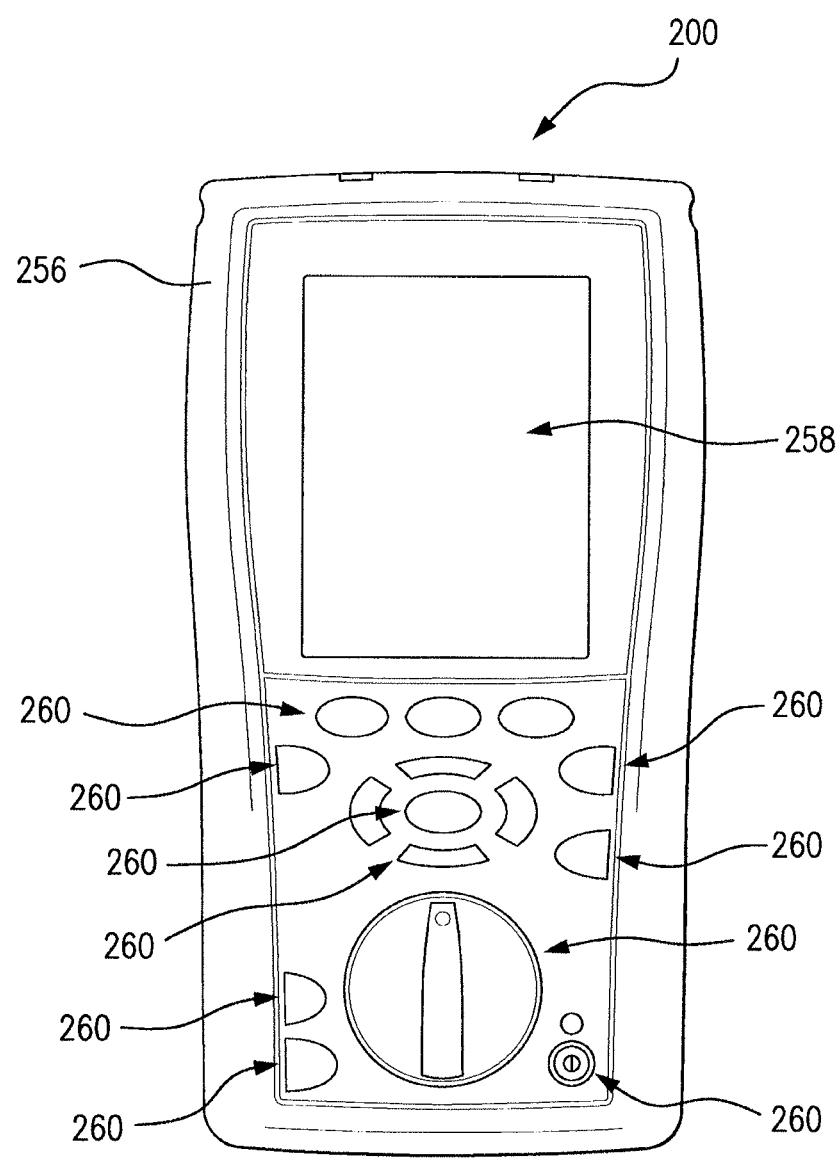
FIG. 2B illustrates external components of the main unit of the OLTS instrument of FIG. 2A in accordance with an embodiment of the present invention.
Figures 4B, 4C, 4D:
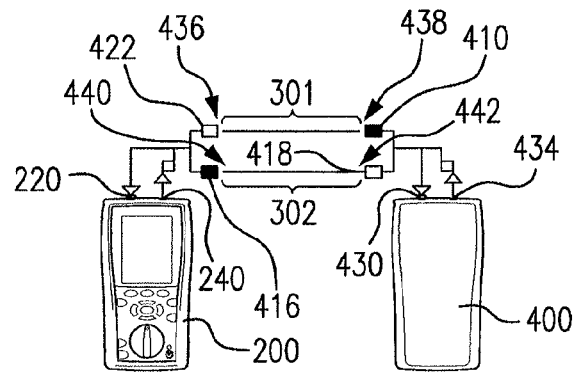
FIG. 4B illustrates an exemplary screenshot of the reference power level test results that may be presented to a user by the main unit of FIGS. 2A and 2B in accordance with an embodiment of the present invention.
FIG. 4C is a diagram illustrating a connection arrangement for attaching both units of the OLTS instrument to an optical fiber link under test in accordance with an embodiment of the present invention.
FIG. 4D illustrates an exemplary screenshot of the loss test results for the fiber link under test of FIG. 4C in accordance with an embodiment of the present invention.

Referring to FIG. 2B, external components of the main unit 200 of FIG. 2A are illustrated in accordance with an embodiment of the present invention. The main unit 200 may be suitably provided in a hand-held form, as shown in FIG. 2B. The remote unit 400, shown in FIGS. 4A and 4C, is preferably provided in a hand-held form as well. According to an embodiment of the present invention, the main unit 200 may comprise a case 256 sized for holding in a user's hand, a display 258, and a plurality of user input controls 260, which may comprise, for example, but not limited to, cursor control keys, buttons, selector knobs, and the like.

Referring now to FIG. 3, an exemplary fiber optic trunk cable, designated broadly at 300, is illustrated. The trunk cable 300 may be used, for example, as the fiber optic link 110 in the exemplary network 100 of FIG. 1. The trunk cable 300 includes a plurality of optical fibers (some of which are shown in FIG. 3), and may include terminals (not shown) at the opposite ends of the fibers. As can be seen in FIG. 3, the fibers 301-304 may be arranged such that they form a plurality of pairs. For example, adjacent fibers 301 and 302 may comprise a first pair, adjacent fibers 303 and 304 may comprise a second pair, and so forth. Each pair may comprise a transmission link, which may be used for data transmission and reception. The plurality of fibers may be arranged in any pattern known in the art.

FIG. 4A is a diagram illustrating one possible connection arrangement for establishing a reference power level, which employs two duplex test reference cords (TRCs). First duplex cord (hereafter referred to as "first TRC") 402 consists of two strands of fiber 402a and 402b. First TRC 402 connects, via the first strand 402a, typically terminated by a snap fitting connector, the output port 240 (connected to the light source 212) of the main unit 200 to the input port 430 of a remote unit 400. The input port 430 may be connected to the power meter of the remote unit 400 (not shown in FIG. 4A). The second strand 402b of the first TRC 402 is not connected in the reference arrangement illustrated in FIG. 4A. Second duplex cord (hereafter referred to as "second TRC") 404 also consists of two strands of fiber 404a and 404b. The second TRC 404 makes the connection in the opposite direction. In other words, the second TRC 404 connects, via the first strand 404a, the output port 434 of the remote unit 400 to the input port 220 of the main unit 200. The output port 434 may be connected to a light source of the remote unit 400 (not shown in FIG. 4A). The input port 220 of the main unit 200 may be connected to its power meter, which may include the optical detector 224. Similarly to the first TRC 402, the second strand 404b of the second TRC 404 is not connected in the reference arrangement illustrated in FIG. 4A.

Once a user connects the main unit 200 to the remote unit 400, as shown in FIG. 4A, the OLTS instrument preferably measures the reference power level values corresponding to each light source. After determining the reference power level values, the main unit 200 of the OLTS instrument may present these values to the user via the display 258, as shown in FIG. 4B. In accordance with an illustrative embodiment of the present invention, FIG. 4B illustrates an exemplary screenshot that may be employed by the main unit 200 to present the measured results at two predetermined wavelength. If the user finds the displayed reference values to be acceptable, the main unit 200 preferably stores the reference values, for example in the memory/storage 234, and may proceed with the optical fiber link test, as described below.

FIG. 4C is a diagram illustrating a connection arrangement for attaching both units of the OLTS instrument to an OFLUT in accordance with an embodiment of the present invention. The OFLUT may comprise a single fiber, a fiber pair, or a plurality of fibers. The OFLUT preferably comprises a pair of fibers (e.g., adjacent fibers 301 and 302 shown in FIG. 3). The connection arrangement shown in FIG. 4C can be formed from the connection arrangement shown in FIG. 4A by disconnecting the connectors 416 and 410 from the input ports 220 and 430 of the main 200 and remote units 400, respectively, and by plugging connectors 420 and 424 of the unused second strands 402b and 404b, respectively, into the adapters 406, thereby separating the main 200 and remote 400 units. After the main 200 and remote 400 units are separated, the user may connect a unit at each end of the OFLUT, as shown in FIG. 4C. For instance, one end 436 of the fiber 301 may be connected to the main unit 200 via the connector 422 while the opposite end 438 of the fiber 301 may be connected to the remote unit 400 via the connector 410. Similarly, one end 440 of the fiber 302 may be connected to the main unit 200 via the connector 416 while the opposite end 442 of the fiber 302 may be connected to the remote unit 400 via the connector 418.

When both main 200 and remote 400 units are connected to the OFLUT (e.g., fibers 301 and 302), the OLTS instrument preferably measures a total insertion loss of the OFLUT. In a preferred embodiment of the present invention, the test manager programs 235, running on the main unit 200 and remote unit 400, communicate with each other over the OFLUT. According to the preferred embodiment, the main 200 and remote 400 units may exchange information comprising, for example, but not limited to, information indicative of a detection of a complete or partial connection, control information pertinent to synchronization of measurements to be made, test results data, and the like. During the power measurement portion of the test, the light source (i.e., optical source 212 shown in FIG. 2A) at each unit emits a continuous wave at the selected wavelengths through the respective output ports 240 and 434. On the distant end, the power meters measure the level of optical power they are receiving through the input ports 220 and 430 and compare it to the reference power level in order to calculate the total amount of light loss. If this total loss is within the specified parameters for the OFLUT, the test passes. It is noted that in addition to the total amount of light loss, the OLTS instrument may measure the length of the OFLUT.

FIG. 4D illustrates an exemplary screenshot of the light loss test results for the OFLUT of FIG. 4C. These results may be presented to the user by the main unit 200 of the OLTS instrument, via the display 258, in accordance with an embodiment of the present invention. The exemplary test results illustrate the detailed measurements of a fiber. As illustrated in FIG. 4D, the results may include the loss for both wavelengths at which the measurements were collected. More specifically, the main unit 200 may display the light loss test results at 1300 nm and at 850 nm. The displayed test results may include a status indicator 454, such as pass or fail. It is noted that the exemplary results shown in FIG. 4D pertain to the fiber 302 that is connected to the input port 220 of the main unit 200. In an embodiment of the present invention, the main unit 200 may display the light loss test results pertaining to the other fiber 301 included in the OFLUT as well.

Once test results for the OFLUT are presented to the user, the main unit 200 preferably stores them, for example, in the memory/storage 234 and may display identifications of next fibers to be tested (i.e., fibers 303 and 304). After the user connects fibers 303 and 304 to the main 200 and remote 400 units in accordance with the connection arrangement shown in FIG. 4C, the main unit 200 preferably automatically detects the connection and preferably performs the test described above for fibers 303 and 304. Upon completion of testing of the second pair (fibers 303 and 304), the main unit 200 preferably presents the results, as shown in FIG. 4D, followed by IDs of the next pair to be tested. Therefore, each time after the fiber pair (OFLUT) is disconnected upon completion of the testing, the main unit 200 shows the next fiber IDs to test. In the preferred embodiment, the test manager programs 235 running on the main unit 200 and remote unit 400 continue detecting if a communication signal is received at their respective input ports 220 and 430. The remote unit 400 preferably attempts to communicate this status to the main unit 200. A complete connection is determined once a signal is detected at both input ports, and, possibly, after detecting that the power level has stabilized within some predetermined limit for some predetermined period of time, depending on the type of the employed connector. Each time a disconnection is detected and a new connection is made, the OLTS instrument performs a new test. Advantageously, the OLTS instrument described herein enables a user to easily control testing of a fiber optic cable by reconnecting both units of the OLTS instrument to a plurality of fiber sets contained in the fiber optic cable without any required interaction with the OLTS instrument between each test.

In an alternative embodiment of the present invention, only the main unit 200 may be employed to test a single fiber at a time. Each of the single fibers under test may be connected to an external light source. In this alternative embodiment, the main unit 200 may continuously check for connection by detecting a significant signal level. The detected signal may by a CW signal or modulated signal. The main unit 200 may display the measured signal or some indication of the connection status to the user via the display 258. In response to detecting a signal and/or in response to detecting that the signal has stabilized, the main unit 200 may then perform a new test. After performing the test, the main unit 200 may check for disconnection by detecting a significant drop in the signal level.

Figure 5:
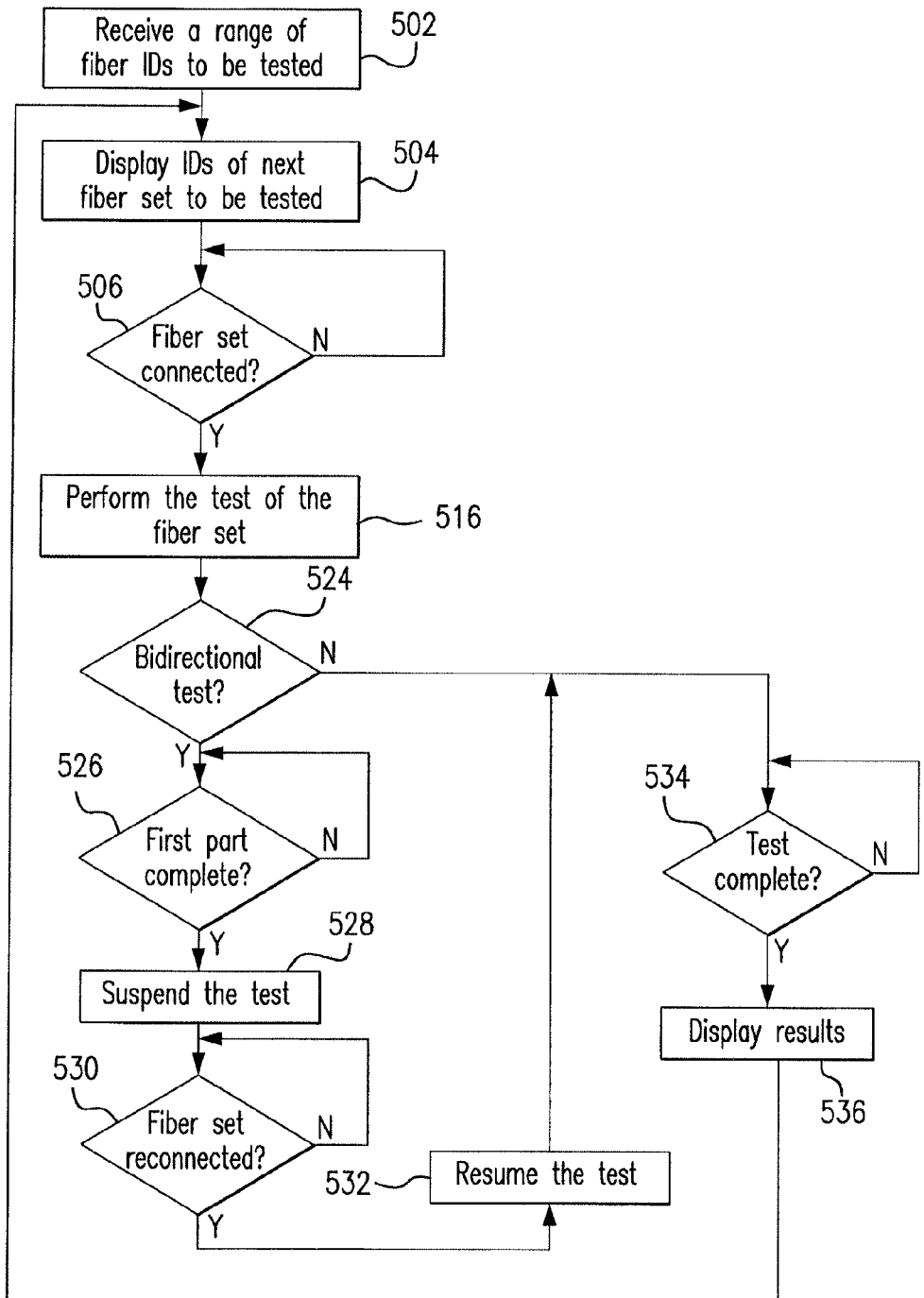
FIG. 5 is a flowchart of operational steps of the test manager program of FIG. 2A in accordance with an illustrative embodiment of the present invention.

FIG. 5 is a flowchart of operational steps of the test manager program 235 of FIG. 2A in accordance with an illustrative embodiment of the present invention. At step 502, the test manager program 235 preferably receives a range of identifiers of fiber sets to be tested. In accordance with an embodiment of the present invention, each fiber set comprises one or more fibers. Preferably, each fiber set comprises a fiber pair. During the test setup, a user preferably enters a plurality of identifiers corresponding to a plurality of fiber sets contained in a trunk fiber optic cable, such as the fiber optic cable 300 (shown in FIG. 3). In addition, the user preferably configures one or more parameters associated with the test, including, but not limited to, wavelengths. The user preferably enters the identifiers by employing, for example, the plurality of user input controls 260 of the main unit 200. Alternatively, a list of the fiber identifiers, received at step 502, may comprise a list of fiber sets that failed during previously run tests, assuming the OLTS instrument is configured to retest the failed fibers.

At step 504, the test manager program 235 preferably sorts the received identifiers and indicates to the user the next fiber set to be tested by displaying the corresponding identifiers on the display 258 of the main unit 200. For example, the test manager program 235 indicates that a first pair of fibers, which includes, for example, fibers 301 and 302, may be tested next. In other words, fibers 301 and 302 comprise the next OFLUT. In response, the user attempts to connect the main unit 200 and the remote unit 400 to the first pair of fibers (OFLUT) by employing TRCs 402 and 404, as shown in FIG. 4D.

At step 506, the test manager program 235 preferably determines whether the first fiber set has been connected to the OLTS instrument. In an embodiment of the present invention, in order to detect whether the first fiber set has been connected, the test manager program 235 preferably instructs the optical source 212 (e.g., a laser diode) of the main unit 200 to emit a modulated "ping" communication signal into one of the fibers under test, at the selected wavelength, through the output port 240. In response, the remote unit 400 preferably sends a similar signal at the same wavelength into another fiber contained in the OFLUT through its own output port 434.

Next, at step 516, the test manager program 235 preferably conducts the test of the OFLUT by, for example, instructing the optical detector 224 to measure the level of optical power it receives through the input port 220 of the main unit 200, as described above in relation to FIG. 3C. Next, the test manager program 235 preferably compares the measured optical power level values with the reference power level value preferably measured during the test setup, as shown in FIG. 4A. At step 524, the test manager program 235 preferably examines a test parameter set by the user in order to determine whether the user is interested in running a bidirectional test. In response to determining that the bidirectional test should be run (step 524, "yes" branch), the test manager program 235 preferably continuously checks whether the first part of the bidirectional test is complete, at step 526. According to an embodiment of the present invention, the first part of the bidirectional test may comprise testing each fiber (e.g., fibers 301 and 302) in one direction only. Once the first part of the bidirectional test is complete (step 526, "yes" branch), the test manager program 235 preferably suspends the test at step 528 and prompts the user to switch the TRCs 402 and 404 at the opposite ends of the fibers 301 and 302 in order to test the reverse direction of the OFLUT. In other words, continuing with the exemplary connection arrangement illustrated in FIG. 4C, to perform the second part of the bidirectional test, first end 436 of the fiber 301 should be connected to the main unit 200 via the connector 416, while the opposite end 438 of the fiber 301 should be connected to the remote unit 400 via the connector 418. Similarly, during the second part of the bidirectional test, first end 440 of the fiber 302 should be connected to the main unit 200 via the connector 422, while the opposite end 442 of the fiber 302 should be connected to the remote unit 400 via the connector 410. Accordingly, at step 530, the test manager program 235 preferably checks whether the OFLUT has been reconnected, and may check if the overall length is the same. Advantageously, the method of testing described herein helps to prevent the user from resuming the test without swapping the corresponding connections because, according to some embodiments of the present invention, at step 530 ("no" branch), the test manager program 235 preferably verifies a disconnection and then a reconnection before proceeding to step 532. At step 532, the test manager program 235 preferably resumes the bidirectional test, in response to determining that the OFLUT has been reconnected (step 530, "yes" branch).

Next, at step 534, the test manager program 235 preferably determines whether the test of the first fiber set is complete. It should be noted that if the test manager program 235 controls the bidirectional test (as determined at step 524), at step 534 the test manager program 235 preferably checks whether the second part of the bidirectional test is complete. In response to determining that the test of the first fiber set is complete (step 534, "yes" branch), at step 536, the test manager program 235 preferably renders the testing results to the user via, for example, the display 258 of the main unit 200. The information obtained from the different parts of the bidirectional test may be combined to produce a single result. After displaying the results of the first fiber set test, the test manager program 235 preferably displays identifications of a second fiber set to be tested. For example, the second fiber set may include fibers 303 and 304 shown in FIG. 3. According to an embodiment of the present invention, the test manager program 235 may repeat steps 504-536 for each fiber set contained in the fiber optic cable subjected to the insertion loss test.

Advantageously, the OLTS instrument described herein enables the user to easily and efficiently control insertion loss testing by reconnecting both units of the OLTS instrument to a plurality of fibers under test without any required interaction with the OLTS instrument between each test.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for testing the operation of an optical fiber cable in a communication network using an optical loss test set (OLTS) instrument having a first unit and a second unit, the method comprising performing by the OLTS instrument the steps of:
    receiving a range of identifiers of fiber sets to be tested, wherein each of the fiber sets comprises one or more fibers;
    displaying identifiers of a first fiber set, wherein the first fiber set is included in the range and wherein the first fiber set comprises a next fiber set to be tested;
    determining whether the first fiber set is connected to the OLTS instrument;
    performing a test of the first fiber set using the OLTS instrument, in response to determining that the first fiber set is connected to the OLTS instrument; and
    displaying identifiers of a second fiber set in response to determining that the test performed on the first fiber set is completed, wherein the second fiber set is included in the range and wherein the second fiber set comprises said next fiber set to be tested.

2. The method of claim 1, further comprising providing results of the performed test to a user, using the first unit of the OLTS instrument.

3. The method of claim 1, wherein the range of identifiers of fiber sets to be tested comprises a range of identifiers of fiber sets predetermined by the OLTS instrument to be retested.

4. The method of claim 1, wherein the step of determining whether the first fiber set is connected to the OLTS instrument comprises sending a plurality of optical signals into the first fiber set.

5. The method of claim 1, wherein the first and second units each have an input port and an output port.

6. The method of claim 1, wherein the first fiber set comprises a first fiber and a second fiber and wherein the step of determining whether the first fiber set is connected to the instrument comprises detecting whether a first end of the first fiber is connected to an output port of the first unit and a second end of the first fiber is connected to an input port of the second unit and determining whether a first end of the second fiber is connected to an input port of the first unit and a second end of the second fiber is connected to an output port of the second unit.

7. The method of claim 1, further comprising determining a reference power level value.

8. The method of claim 7, wherein the step of performing a test of the first fiber set using the OLTS instrument comprises determining power level values corresponding to the first fiber set and comparing said power level values with the reference power level value.

9. The method of claim 2, further comprising storing the results of the performed test in the first unit of the OLTS instrument.

10. A non-transitory computer program product for testing the operation of an optical fiber cable in a communication network using an optical loss test set (OLTS) instrument having a first unit and a second unit, the computer program product comprising:
    one or more computer-readable storage devices and a plurality of program instructions stored on at least one of the one or more computer-readable storage devices, the plurality of program instructions comprising:
    program instructions to receive a range of identifiers of fiber sets to be tested, wherein each of the fiber sets comprises one or more fibers;
    program instructions to display identifiers of a first fiber set, wherein the first fiber set is included in the range and wherein the first fiber set comprises a next fiber set to be tested;
    program instructions to determine whether the first fiber set is connected to the OLTS instrument;
    program instructions to perform a test of the first fiber set, in response to determining that the first fiber set is connected to the OLTS instrument; and
    program instructions to display identifiers of a second fiber set in response to determining that the first fiber set is, wherein the second fiber set is included in the range and wherein the second fiber set comprises said next fiber set to be tested.

11. The computer program product of claim 10, further comprising program instructions to provide results of the performed test to a user.

12. The computer program product of claim 10, wherein the range of identifiers of fiber sets to be tested comprises a range of identifiers of fiber sets predetermined by the OLTS instrument to be retested.

13. The computer program product of claim 10, wherein the program instructions to determine whether the first fiber set is connected to the OLTS instrument comprise program instructions to send a plurality of optical signals into the first fiber set.

14. The computer program product of claim 10, wherein the first and second units each have an input port and an output port.

15. The computer program product of claim 10, wherein the first fiber set comprises a first fiber and a second fiber and wherein the program instructions to determine whether the first fiber set is connected to the instrument comprise program instructions to detect whether a first end of the first fiber is connected to an output port of the first unit and a second end of the first fiber is connected to an input port of the second unit and comprise program instructions to determine whether a first end of the second fiber is connected to an input port of the first unit and a second end of the second fiber is connected to an output port of the second unit.

16. The computer program product of claim 10, further comprising program instructions to determine a reference power level value.

17. The computer program product of claim 16, wherein the program instructions to perform a test of the first fiber set using the OLTS instrument comprise program instructions to determine power level values corresponding to the first fiber set and program instructions to compare said power level values with the reference power level value.

18. The computer program product of claim 11, further comprising program instructions to store the results of the performed test in the first unit of the OLTS instrument.

19. A method for testing the operation of an optical fiber connected to an external light source in a communication network using an optical loss test set (OLTS) instrument, the method comprising the steps of:
- determining whether the optical fiber is connected to the OLTS instrument;
- displaying a connection status indicator, in response to determining that the optical fiber is connected to the OLTS instrument;
- performing a test of the optical fiber using the OLTS instrument, in response to determining that the optical fiber set is connected to the OLTS instrument; and
- determining whether the optical fiber is disconnected from the OLTS instrument by continually checking connection between the optical fiber set and the OLTS instrument.

20. The method of claim 19, wherein the step of determining whether the optical fiber is connected to the OLTS instrument comprises detecting an optical signal transmitted by the external light source.

* * * * *